United States Patent
Mancini et al.

(10) Patent No.: US 9,457,530 B2
(45) Date of Patent: Oct. 4, 2016

(54) PROCESS AND APPARATUS FOR BUILDING TYRES

(75) Inventors: Gianni Mancini, Milan (IT); Gaetano Lo Presti, Milan (IT); Maurizio Marchini, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 953 days.

(21) Appl. No.: 12/449,518

(22) PCT Filed: Feb. 14, 2008

(86) PCT No.: PCT/IB2008/050538
§ 371 (c)(1),
(2), (4) Date: Oct. 27, 2009

(87) PCT Pub. No.: WO2008/099363
PCT Pub. Date: Aug. 21, 2008

(65) Prior Publication Data
US 2010/0096070 A1  Apr. 22, 2010

(30) Foreign Application Priority Data

Feb. 15, 2007  (WO) .................. PCT/IB2007/050498

(51) Int. Cl.
 *B29D 30/24* (2006.01)
 *B29D 30/32* (2006.01)
 (Continued)

(52) U.S. Cl.
 CPC ............. *B29D 30/245* (2013.01); *B29D 30/26* (2013.01); *B29D 30/32* (2013.01); *B29D 2030/202* (2013.01); *B29D 2030/3214* (2013.01)

(58) Field of Classification Search
 CPC .. B29D 30/005; B29D 30/245; B29D 30/32; B29D 2030/202; B29D 2030/204; B29D 2030/206; B29D 2030/2664; B29D 2030/3214
 USPC ............. 156/111, 117, 126, 130.7, 131–133, 156/135, 398, 400–403, 415, 396
 See application file for complete search history.

(56) References Cited

U.S. PATENT DOCUMENTS 1,756,327 A * 4/1930 Allensworth .......... B29D 30/32
 156/403
1,871,604 A * 8/1932 Graham ................. B29D 30/32
 156/403

(Continued)

FOREIGN PATENT DOCUMENTS

EP  0 071 840 A1  2/1983
EP  1 312 462 B1  5/2003

(Continued)

OTHER PUBLICATIONS

Notice of Reasons for Rejection dated Jun. 22, 2012 by Japan Patent Office on Jun. 22, 2012 in corresponding Application No. JP JP 2009-549981.

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

Two auxiliary support members are operatively engaged with a building drum, in axially approached relationship with respective halves of the drum itself, each auxiliary member having a circumferential rest surface extending in the continuation of an outer circumferential surface of the building drum itself. Applied around the outer circumferential surface of the building drum is at least one carcass ply having axially opposite end flaps each lying on the circumferential rest surface of the respective auxiliary support member. A pair of auxiliary shaping members engaged with the building drum in place of the auxiliary support members, each act against a circumferential abutment edge carried by the building drum, to enable the carcass ply to be shaped into a toroidal configuration concurrently with mutual approaching of the halves of the building drum.

26 Claims, 5 Drawing Sheets

(51) Int. Cl.
  *B29D 30/26* (2006.01)
  *B29D 30/20* (2006.01)

(56) References Cited

U.S. PATENT DOCUMENTS

| | | | | |
|---|---|---|---|---|
| 2,818,907 A * | 1/1958 | Sapp | | 156/396 |
| 3,718,520 A * | 2/1973 | Leblond | | 156/400 |
| 3,728,194 A * | 4/1973 | Enders | | 156/400 |
| 3,740,293 A * | 6/1973 | Jones et al. | | 156/415 |
| 3,816,202 A * | 6/1974 | Stokes | | 156/123 |
| 3,826,297 A | 7/1974 | Alderfer | | |
| 3,853,653 A | 12/1974 | Olbert et al. | | |
| 3,873,397 A * | 3/1975 | Leblond et al. | | 156/401 |
| 3,990,931 A | 11/1976 | Leblond et al. | | |
| 5,268,057 A | 12/1993 | Nojiri et al. | | |
| 6,390,166 B1 | 5/2002 | Roberts et al. | | |
| 7,128,117 B2 | 10/2006 | Currie et al. | | |
| 2005/0274449 A1 | 12/2005 | Tokunaga | | |
| 2006/0011285 A1 * | 1/2006 | Suda | | 156/117 |

FOREIGN PATENT DOCUMENTS

| | | | |
|---|---|---|---|
| EP | 1 510 330 B1 | | 3/2005 |
| EP | 1 621 327 B1 | | 2/2006 |
| JP | 06-055664 | | 3/1994 |
| JP | 2006-248163 A | * | 9/2006 |
| SU | 521142 | | 7/1976 |
| SU | 1281442 | | 7/1987 |
| SU | 687720 | | 7/1991 |
| WO | WO 01/89819 A1 | | 11/2001 |
| WO | WO-02/094545 A1 | * | 11/2002 |
| WO | WO 2004/060642 A2 | | 7/2004 |
| WO | WO 2005/097478 A1 | | 10/2005 |
| WO | WO 2005/123371 A1 | | 12/2005 |
| WO | WO 2006/058599 A1 | | 6/2006 |

OTHER PUBLICATIONS

English-language translation of Notice of Reasons for Rejection dated Jun. 22, 2012 by Japan Patent Office on Jun. 22, 2012 in corresponding Application No. JP JP 2009-549981.

Decision on Grant Patent for Invention issued Feb. 13, 2012 in corresponding Russian Patent Application No. 2009129126/05(040479) (20 pages).

Official Action issued by Federal Institute of Industrial Property on Dec. 12, 2011 in corresponding Russian Patent Application No. 2009129126/05(040479) (3 pages).

English-language translation of Official Action issued by Federal Institute of Industrial Property on Dec. 12, 2011 in corresponding Russian Patent Application No. 2009129126/05(040479) (3 pages).

Notification of the First Office Action issued by State Intellectual Property Office of the People's Republic of China on Dec. 28, 2011 in corresponding China Patent Application No. 200880005129.4 (4 pages).

English-language translation of Notification of the First Office Action issued by State Intellectual Property Office of the People's Republic of China on Dec. 28, 2011 in corresponding China Patent Application No. 200880005129.4 (5 pages).

* cited by examiner

PROCESS AND APPARATUS FOR BUILDING TYRES

CROSS REFERENCE TO RELATED APPLICATION

This application is a national phase application based on PCT/IB2008/050538, filed Feb. 14, 2008, and claims the priority of PCT/IB2007/050498, filed Feb. 15, 2007, the content of both of which is incorporated by reference.

BACKGROUND OF THE INVENTION

1. Field of the Invention

The present invention relates to a process and an apparatus for building tyres.

More particularly, the invention is addressed to the process and equipment used for building green tyres, to be subsequently submitted to a vulcanisation cycle, thereby obtaining the final product.

2. Description of the Related Art

A tyre for vehicle wheels generally comprises a carcass structure including at least one carcass ply having respectively opposite end flaps in engagement with respective annular anchoring structures, integrated into the regions usually identified as "beads", having an inner diameter substantially corresponding to a so-called "fitting diameter" of the tyre on a respective mounting rim.

Associated with the carcass structure is a belt structure comprising one or more belt layers, located in radially superposed relationship with each other and with the carcass ply and having textile or metallic reinforcing cords with a crossed orientation and/or substantially parallel to the circumferential extension direction of the tyre. A tread band is applied to the belt structure at a radially external position, which tread band too is made of elastomeric material like other semifinished products constituting the tyre.

In addition, respective sidewalls of elastomeric material are applied, at an axially external position, to the side surfaces of the carcass structure, each extending from one of the side edges of the tread band until close to the respective annular anchoring structure to the beads. In tyres of the "tubeless" type, an air-tight coating layer, usually referred to as "liner" covers the inner surfaces of the tyre.

Subsequently to building of the green tyre carried out through assembly of the respective components, a moulding and vulcanisation treatment is generally carried out; it aims at causing structural stabilisation of the tyre through cross-linking of the elastomeric compositions and also at impressing it with a desired tread pattern, as well as with possible distinctive graphic marks at the sidewalls.

The carcass structure and belt structure are generally made separately of each other in respective work stations, to be mutually assembled at a later time.

In more detail, manufacture of the carcass structure first contemplates application of the carcass ply or plies onto a building drum, to form a so-called "carcass sleeve" that is substantially cylindrical. The annular anchoring structures to the beads are fitted or formed on the opposite end flaps of the carcass ply or plies that are subsequently turned up around the annular structures themselves so as to enclose them in a sort of loop.

Simultaneously, on a second or auxiliary drum a so-called "outer sleeve" is made which comprises the belt layers applied in mutual radially-superposed relationship, and possibly the tread band applied at a radially external position to the belt layers. The outer sleeve is then picked up from the auxiliary drum to be coupled to the carcass sleeve. To this aim the outer sleeve is coaxially disposed around the carcass sleeve and afterwards the carcass ply or plies are shaped into a toroidal configuration by mutual axial approaching of the beads and simultaneous admission of fluid under pressure to the inside of the carcass sleeve, so as to determine radial expansion of the carcass plies until adhesion of same against the inner surface of the outer sleeve is caused.

Assembling of the carcass sleeve to the outer sleeve can be carried out on the same drum as used for manufacture of the carcass sleeve, in which case reference is made to a "unistage building process".

Also known are building processes of the so-called "two-stage" type in which a so-called "first-stage drum" is employed to make the carcass sleeve, while assembly between the carcass structure and outer sleeve is carried out on a so-called "second-stage drum" or "shaping drum" onto which the carcass sleeve picked up from the first-stage drum, and subsequently the outer sleeve picked up from the auxiliary drum are transferred.

EP 1 312 462 discloses a building system in which a ply feeding station, a carcass building station, an assembly station and a belt building station provided with the respective drums are disposed along a production line. Transport members movable along the production line carry out transfer of the products being manufactured from a work station to another, by removing the product from a drum in order to place it on the drum of the subsequent station.

U.S. Pat. No. 3,990,931 discloses a unistage building process in which use is provided for a drum which is expandable in a radial direction to cause engagement of the carcass structure at the annular anchoring structures, and contractible in an axial direction to give rise to shaping of the carcass ply following admission of fluid between the carcass ply and the drum itself.

U.S. Pat. No. 7,128,117 discloses a first-stage drum provided with a central portion and two end portions located at axially opposite positions relative to the central portion. The central portion is circumferentially divided into radially movable sectors to expand the central portion between a contracted position and a radially expanded position. The carcass sleeve formed on the first-stage drum has the annular reinforcing structures fitted on the drum end portions, carrying respective inflatable turning-up bags in axial abutment relationship against the central portion provided in the radially expanded condition for support of the carcass plies.

U.S. Pat. No. 6,390,166 discloses a first-stage drum in which the end portions are radially expandable and contractible together with the central portion to enable engagement and removal of the carcass sleeve, and axially movable close to and away from each other to adapt the axial size of the drum to the width of the tyre being manufactured.

U.S. Pat. No. 3,826,297 contemplates use of a dismountable first-stage drum to enable disengagement of the carcass sleeve previously formed by positioning annular anchoring structures against side shoulders provided on the drum, and subsequently forming the carcass ply or plies through application of circumferentially consecutive strip-like elements to cover the circumferential extension of the first-stage drum.

SUMMARY OF THE INVENTION

According to the present invention, the Applicant has examined the problem of increasing the daily productivity in tyres different from each other in size and structure, while maintaining a high degree of operating flexibility in the production itself. More specifically, "operating flexibility" in this context means the possibility of using, for each tyre, elementary components that are different from each other due to the type of elastomeric material or the type of textile or metallic reinforcing cord employed therein.

The Applicant has verified that by carrying out building of a tyre in two or more work stations, each dedicated to specific working steps and individually adaptable to working of different types of tyres, it is possible to achieve a reduction in the time necessary for completing a work cycle, and a greater adaptability of the individual station, and consequently of the plant as a whole, to working of tyres of different types and sizes.

The Applicant has also ascertained that an excellent quality of the product can be obtained by carrying out the whole manufacture of the green tyre without removing the carcass structure from the building drum.

More specifically, the Applicant has ascertained that the above can be obtained by first moving the carcass structure to the different work stations until building of same on its own building drum has been completed, possibly with the aid of suitable support members for supporting the axially external ends of at least one carcass ply or of other components of the carcass structure itself; and by subsequently carrying out shaping of said carcass structure by the action of at least one suitable shaping member external to said building drum, said at least one member being adapted to enable the shaping operation without releasing the built carcass structure from the building drum.

The Applicant has therefore found that by use of a building drum adapted to be associated, when building of the carcass structure has been completed, with at least one shaping member to enable toroidal conformation of the tyre being worked, it is possible to solve said problems related to sequential building of tyres different from each other in sizes, structure and materials, so as to inter alia improve both the production aspects and the quality of the obtained products.

More specifically, according to a first aspect the present invention relates to a process for building tyres, comprising the steps of:

providing a building drum comprising two halves that can be axially moved close to each other;

applying at least one carcass ply around an outer circumferential surface of the building drum;

engaging at least one auxiliary shaping member distinct from the building drum, to the building drum itself;

shaping said at least one carcass ply into a toroidal configuration concurrently with mutual approaching of the building drum halves.

The process according to the invention therefore allows green tyres to be obtained while maintaining the carcass structure of the tyre being worked fixed on its building drum, through use of elementary components also different from each other, in a plurality of work stations. In this way the Applicant has noticed that the desired flexibility can be obtained without impairing the plants' productivity.

In accordance with a further aspect, the present invention relates to an apparatus for building tyres, comprising:

a building drum made up of two halves to be axially approached and having at least one outer circumferential surface designed to support at least one carcass ply applied around the building drum itself;

at least one auxiliary shaping member, distinct from said building drum, to be removably engaged to the building drum to enable the toroidal conformation of said at least one carcass ply to be achieved concurrently with mutual approaching of said halves of the building drum.

The present invention, in at least one of the above mentioned aspects, can have one or more of the preferred features described hereinafter.

Before application of said at least one carcass ply, auxiliary support members each having at least one circumferential rest surface extending in the continuation of the outer circumferential surface of the building drum are engaged to the building drum, each of them in axially approached relationship with one of said halves.

Said at least one carcass ply applied around the outer circumferential surface of the building drum has axially opposite end flaps each laying on the circumferential rest surface of the respective auxiliary support member.

Said auxiliary support members are released from the building drum before engagement of said at least one auxiliary shaping member.

Said at least one auxiliary shaping member preferably acts against a circumferential abutment edge carried by the building drum.

Preferably, a pair of auxiliary shaping members are brought into engagement with the building drum, each of them being in axially approached relationship with one of said halves.

Each auxiliary support member is engaged to the building drum at least at one connecting member carried by the building drum itself.

Preferably, each auxiliary shaping member is engaged to said at least one connecting member, in place of each auxiliary support member.

The Applicant has realised that in said preferred embodiment solving the problems set out above, a building drum is to be available which includes suitable connecting members adapted to be operatively associated both with the auxiliary support members required for the different building steps of different components, and with said auxiliary shaping members necessary at the end of building to allow the drum itself to achieve the conformation of the tyre being processed.

Preferably, said apparatus further comprises at least one pair of auxiliary support members to be removably engaged to the building drum, each in axially approached relationship with one respective half of the building drum, and having respective circumferential rest surfaces extending in the continuation of said outer circumferential surface so as to support at least axially opposite end flaps of said at least one carcass ply.

Preferably, said at least one auxiliary shaping member can be removably engaged to the building drum in place of said auxiliary support member.

Still more preferably, a pair of auxiliary shaping members can be removable engaged to the building drum, each of them in axially approached relationship with a respective one of said halves.

According to a preferred embodiment, each of said auxiliary support members can be operatively engaged to a connecting member carried by the building drum.

Preferably, said at least one auxiliary shaping member acts against a respective circumferential abutment edge of the building drum.

Preferably, said at least one auxiliary shaping member can be operatively engaged to a connecting member carried by the building drum.

More particularly, the connecting members are each integrally carried by one of the halves of the building drum.

Each connecting member comprises a cylindrical sleeve to be selectively coupled to a first and a second engagement seat carried by each auxiliary support member and by said at least one auxiliary shaping member, respectively.

Preferably each auxiliary support member comprises a fitting element to be operatively coupled to at least one of said connecting members.

Still more preferably, said fitting element radially projects from a first engagement seat carried by the auxiliary support member and operates in spring thrust relationship with a recess formed in the respective connecting member.

In a preferred embodiment, said circumferential rest surfaces have a substantially cylindrical conformation with a diameter substantially corresponding to the diameter of the outer circumferential surface of the building drum.

Therefore said connecting members standardise the mechanical association of the building drum with external devices distinct from said drum and required for accomplishment of the built green tyre, in accordance with the above depicted productivity and flexibility features, also reducing the manufacturing complexity of the building drum itself.

According to a preferred embodiment, after said shaping step, the steps of radially contracting the building drum and of releasing the tyre being processed from the building drum are carried out.

Preferably, after the step of releasing the auxiliary support members and before the step of engaging said at least one auxiliary shaping member, the step of engaging at least one annular anchoring structure with at least one end flap of said at least one carcass ply so as to form a carcass sleeve, is carried out.

Carrying out of this step after the step of releasing the auxiliary support members enables annular anchoring structures to be used which define a smaller fitting diameter than the winding diameter of the carcass ply/plies on the building drum.

Before engagement of said annular anchoring structures, axially opposite end flaps of said at least one carcass ply are preferably turned up towards a geometric axis of the building drum, so as to facilitate insertion of the annular anchoring structures around the end flaps.

The step of engaging each annular anchoring structure comprises:
coaxially fitting the annular anchoring structure around the respective end flap of said at least one carcass ply;
turning up the end flap of said at least one carcass ply around the respective annular anchoring structure.

Said at least one auxiliary shaping member is brought into thrust relationship against said at least one annular anchoring structure.

Concurrently with engagement of said at least one auxiliary shaping member with the building drum, a step of locking said at least one carcass ply relative to said at least one annular anchoring structure is carried out.

Engagement of said at least one auxiliary shaping member with the building drum preferably comprises the steps of fastening a flanged element of the auxiliary shaping member relative to the building drum, and of pushing a sealing ring of the auxiliary shaping member against said abutment edge.

Fastening of the flanged element ensures an efficient counteraction of the thrusts generated during the shaping step, by effect of fluid under pressure admitted to the inside of the carcass structure. The thrust of the sealing ring in turn ensures locking of the carcass plies relative to the annular anchoring structures, also in the presence of plastic yielding of the elastomeric material.

Preferably, at least the carcass ply/plies is obtained through laying of elementary components onto the building drum.

More particularly, application of said at least one carcass ply comprises a step of applying a plurality of strip-like elements disposed in succession along the circumferential extension of the outer surface of the building drum.

Preferably, before shaping the carcass ply, a step of positioning an outer sleeve comprising at least one belt structure in a coaxially centred position around said at least one carcass ply is carried out, in order to apply said at least one carcass ply against a radially internal surface of the outer sleeve following said shaping step.

Said at least one auxiliary shaping member comprises a plurality of respectively concentric sealing rings having respectively different diameters. The auxiliary shaping members are thus suitable for processing a wide range of tyres having fitting diameters different from each other.

The building drum further comprises a central section slidably engaging said halves and defining a central section of said outer surface.

In this way a greater versatility of use of the drum is achieved, so that said drum is adapted to processing of tyres having different sizes in terms of distance between centres of the annular anchoring structures.

The building drum comprises circumferential sectors that are radially movable between a work condition at which they extend in circumferential-continuity relationship to define said outer surface, and a rest condition at which they are radially approached relative to a geometric axis of the building drum to enable removal of the tyre being processed from the building drum itself.

Preferably, each auxiliary shaping member acts in thrust relationship against a respective annular anchoring structure in engagement with end flaps of said at least one carcass ply.

Preferably, each auxiliary shaping member comprises at least one flanged element to be removably fastened, in axially approached relationship, to the respective half of the building drum, and carrying at least one sealing ring designed to act against the respective circumferential abutment edge carried by the building drum.

Preferably, said at least one flanged element carries a fastening device to be operatively coupled to at least one of said connecting members.

Still more preferably, said fastening device comprises a brake operatively mounted on a guide sleeve to be slidably engaged on said connecting member.

According to a preferred embodiment, each of said auxiliary shaping members further comprises thrust devices operating between the flanged element and the sealing ring to push the latter towards the circumferential abutment edge.

Preferably, said at least one sealing ring acts against said circumferential abutment edge through a radially external frustoconical surface of the sealing ring itself.

Preferably, said at least one sealing ring is radially expandable upon the action of the thrust devices.

Preferably, said thrust devices comprise a thrust ring axially movable towards the sealing ring upon the action of a fluid-operated actuator.

More preferably, the sealing ring has a radially internal frustoconical surface facing a circumferential edge of the thrust ring.

According to a preferred embodiment, said apparatus further comprises:
at least one building station carrying devices for application of a carcass sleeve comprising said at least one carcass ply, onto the building drum;

devices for assembling an outer sleeve, comprising a belt structure, to the carcass sleeve;

devices for transferring the building drum from the building station to a position outside said station.

The building drum preferably comprises a central shaft carrying at least one grip end to be engaged by transfer devices.

Preferably, a handling device operates in the building station for engagement and release of said auxiliary support members, with and from the building drum.

Preferably, said application devices comprise members for engaging annular anchoring structures with respective end flaps of said at least one carcass ply, so as to form a carcass sleeve.

More preferably, said annular anchoring structure defines a fitting diameter smaller than the application diameter defined by the outer circumferential surface of the building drum.

In a preferred embodiment said apparatus comprises:
devices for positioning said outer sleeve to a coaxially centred position around the carcass sleeve applied onto said building drum;
shaping devices operating on the building drum to shape the carcass sleeve into a toroidal configuration.

Preferably, the devices for engaging each annular anchoring structure comprise:
members for coaxially fitting the annular anchoring structure around the respective end flap of said at least one carcass ply;
members for turning up the end flap of said at least one carcass ply around the respective annular anchoring structure.

Preferably, said apparatus further comprises devices for folding back the axially opposite end flaps of said at least one carcass ply towards a geometric axis of the building drum.

Preferably, said devices for application of said at least one carcass ply lay down elementary components on the building drum.

Preferably, the devices for application of said at least one carcass ply comprise members for applying a plurality of strip-like elements consecutively in succession along the circumferential extension of the outer circumferential surface of the building drum.

Further features and advantages will become more apparent from the detailed description of a preferred, but not exclusive, embodiment of a process and an apparatus for building tyres, in accordance with the present invention.

BRIEF DESCRIPTION OF THE DRAWINGS

This description will be set out hereinafter with reference to the accompanying drawings, given by way of non limiting example, in which.

DETAILED DESCRIPTION OF THE INVENTION

With reference to said drawings, an apparatus for building tyres for vehicle wheels provided for carrying out a process in accordance with the present invention has been generally identified by reference numeral 1.

Apparatus 1 is intended for manufacture of tyres 2 (FIG. 5) essentially comprising at least one carcass ply 3 preferably internally coated with a layer of elastomeric airtight material or a so-called liner 4. Two annular anchoring structures 5, each comprising a so-called bead core 5a preferably carrying an elastomeric filler 5b at a radially external position, are engaged with respective end flaps 3a of the carcass ply or plies 3. Integration of the annular anchoring structures 5 occurs close to regions usually identified as "beads" 6, at which engagement between tyre 2 and a respective mounting rim (not shown) usually takes place, according to a fitting diameter D0 determined by the inner diametrical sizes of the annular anchoring structures 5.

Figure 5:
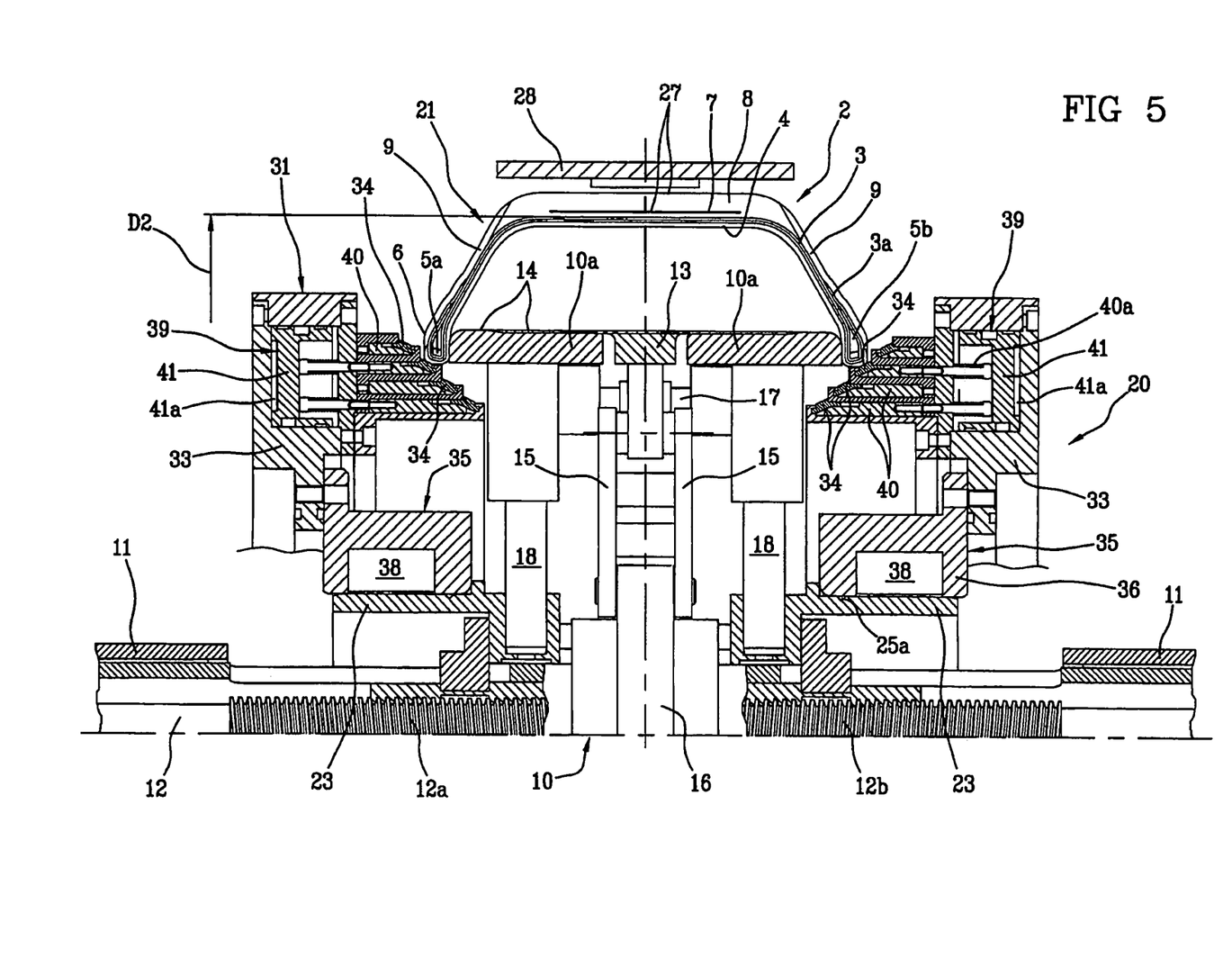
FIG. 5 shows a tyre being processed in the step during which the carcass sleeve is shaped for application of an outer sleeve thereto.

A belt structure 7 is circumferentially applied around the carcass ply/plies 3 and a tread band 8 circumferentially overlaps the belt structure 7. Two sidewalls 9, each extending from the corresponding bead 6 to a respective side edge of the tread band 8, are applied to the carcass ply/plies 3 at laterally opposite positions.

Apparatus 1 comprises a building drum 10 made up of two halves 10a supported by a central shaft 11 extending along a geometric axis X-X of the building drum 10 itself. Halves 10a can be moved axially close to each other, upon command of a screw threaded bar 12 for example, that is operatively disposed within the central shaft 11 and carries two threaded portions 12a, 12b, with a right-hand thread and a left-hand thread respectively, each of them engaging one of halves 10a. As a result, halves 10a of the building drum 10 are induced to simultaneously translate in respectively opposite directions along the central shaft 11, following rotations imparted to the screw threaded bar 12 by means of an actuator (not shown) that can be operatively coupled to one end of the central shaft 11.

The building drum 10 can further comprise a central section 13 slidably engaging halves 10a and extending in surface-continuity relationship with the latter so as to define a substantially continuous outer surface 14 therewith.

Halves 10a and central section 13 are each made up of respective circumferential sectors, radially movable between a rest condition (not shown) at which they are disposed radially close to the geometric axis X-X to give the building drum 10 a diametrical bulkiness smaller than the fitting diameter D0 of the tyre being processed, so as to enable removal of the tyre 2 being processed from the building drum itself, and a work condition at which, as shown in the accompanying figures, said sectors extend in circumferential-continuity relationship so as to form said outer surface 14 defining an application diameter D1 that is preferably greater than the fitting diameter D0.

In the example shown, radial movement of the circumferential sectors is carried out through a plurality of connecting rods 15, each of them being linked between one of the sectors of the central section 13 of the building drum 10, and a drive collar 16 rotatably carried by the central shaft 11 and drivable in angular rotation by means of an outer actuator (not shown). By means of transmission bars 17 axially extending through the sectors of the central section 13, the radial movements of said sectors are transmitted to the circumferential sectors of the axially opposite halves 10a of the building drum 10, slidably guided along respective columns 18 radially extending relative to the central shaft 11.

The building drum 10 lends itself to be transferred by at least one robotized arm (not shown) or transfer devices of other type operating on at least one grip end 11a provided on the central shaft 11, to one or more work stations 19, 20 to enable carrying out of different working steps aiming at assembling tyre 2 being processed.

In more detail, the building drum 10 is first engaged in a building station 19 (FIGS. 1 to 3) in which a so-called carcass sleeve 21 comprising the carcass ply/plies 3 coupled to the respective annular anchoring structures 5 is made.

At least one external handling device (not shown as it can be made in known manner) carries out positioning of auxiliary support members 22, made in the form of two annular elements for example, in an axially approached relationship on axially opposite sides relative to the building drum 10.

The auxiliary support members 22 have respective rest surfaces 22a preferably having a substantially cylindrical conformation, the diameter of which is substantially the same as the application diameter D1. When approaching has occurred, the rest surfaces 22a extend without interruption in the continuation of the outer surface 14.

Engagement of the support members 22 with the building drum 10 takes place at respective connecting members 23 carried by the building drum itself, each made in the form of a cylindrical sleeve for example, that is integrally carried by one of the halves 10a of the building drum 10 and can be operatively coupled to a first engagement seat 24 carried by the respective auxiliary support member 22.

Figures 1, 1A:
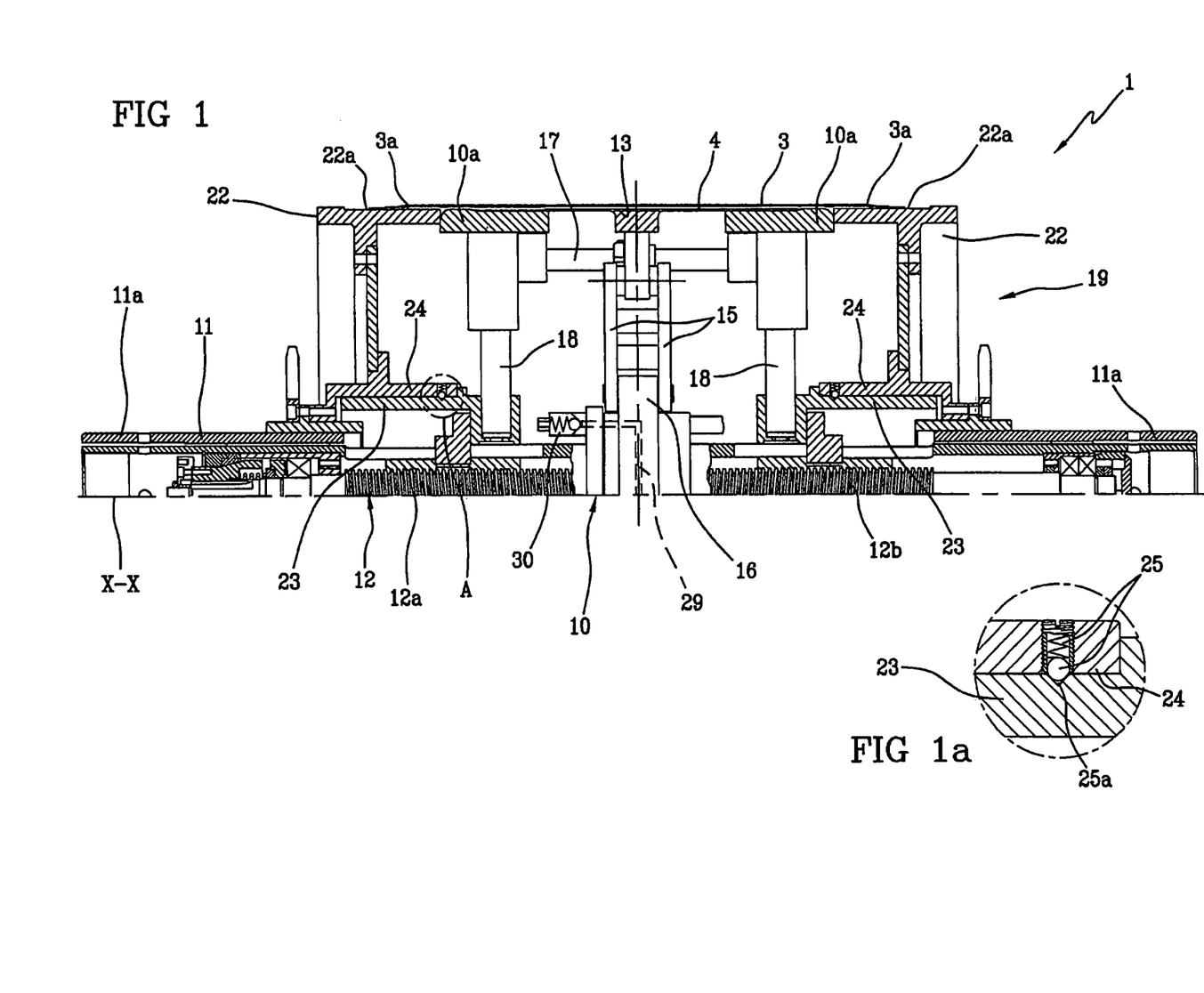
FIG. 1 diagrammatically shows a step of applying a carcass ply around a building drum, seen in diametrical section.
FIG. 1a shows the detail identified by A in FIG. 1, to an enlarged scale.

One or more fitting elements 25, made in the form of small balls spring-pushed towards the geometric axis X-X, radially project inwardly of the first engagement seat 24 to be operatively coupled in spring thrust relationship with at least one recess 25a in the form of a circumferential groove for example, formed in the respective connecting member 23. Consequently, the fitting elements 25 are suitable for automatic engagement into the recesses 25a of the respective connecting members 23, so as to retain each auxiliary support member 22 in engagement with the building drum 10 also after release of the members themselves by said external handling device. Thus the building drum can be transferred, when necessary, between at least one first and one second work unit (not shown) provided in the building station 19, together with the auxiliary support members 22 linked thereto.

In the building station 19 for example, auxiliary devices (not shown) can operate for application of first components of the carcass sleeve 21, at the building drum 10. In more detail, these auxiliary devices can comprise one or more dispensing members for example, supplying at least one continuous elongated element of elastomeric material while the building drum 10 is being driven in rotation around its geometric axis X-X, so as to form the above mentioned liner 4 on the outer surface 14 and the rest surfaces 22a. In addition or as an alternative to liner 4, the auxiliary devices can be designed to form either abrasion-preventing inserts on the rest surfaces 22a, which inserts are to be incorporated close to beads 6 and/or, when the so-called run-flat tyres are concerned, auxiliary support inserts made of elastomeric material (the so-called sidewall inserts), applied to the respective halves 10a of the building drum 10, to be then incorporated into tyre 2 in the sidewall 9 region.

Subsequently to formation of said first components, devices not shown as made in any convenient manner apply the carcass ply/plies 3 around the outer surface 14, according to said application diameter D1. Each carcass ply 3 can consist of a manufactured article in the form of a continuous strip previously cut according to the circumferential extension of the outer surface 14 and delivered towards said outer surface, while the building drum 10 is being rotated around its geometric axis X-X, so as to cause winding of said strip around the outer surface 14.

In a preferred embodiment, at least the carcass ply/plies 3 and/or other parts of tyre 2 are made through laying of elementary components. To the aims of the present invention, by "elementary components" it is intended continuous elongated elements, textile and/or metallic rubberised cords, strip-like elements. In connection with the present description, by the term "strip-like element" it is intended a strip of elastomeric material cut to size and comprising one or more textile or metallic reinforcing cords.

These elementary components are adapted to be used in a suitable amount to form one or more of the above described constituent elements of the tyre, without requiring storage of semifinished products.

To this aim, the application devices comprise members for sequentially applying a plurality of strip-like elements disposed transversely relative to the circumferential extension of the outer surface 14, while the building drum 10 is being driven in rotation with a stepping motion, in the same manner as described in document U.S. Pat. No. 6,328,084 in the name of the same Applicant, for example.

The carcass ply/plies is/are then preferably directly formed on the building drum 10, by means of the strip-like elements applied in mutually approached relationship to cover the whole circumferential extension of the outer surface 14.

Preferably, the outer surface 14 has a smaller axial dimension than the width of said at least one carcass ply 3, so that the end flaps 3a of the carcass ply/plies 3 disposed on the building drum 10 axially project from the opposite ends of the outer surface 14 and are at least partly supported by said rest surfaces 22a.

When formation of the carcass ply/plies 3 has been completed, the auxiliary support members 22 are released from the respective connecting members 23. This release action can be obtained with the aid of said external handling device for example, by a mere operation involving axial moving apart of the building drum 10 from the respective halves 10a, so as to remove the rest surfaces 22a from the abrasion-preventing inserts and/or from liner 4 and/or from the carcass ply/plies 3, by slipping off. After release, the auxiliary support members 22 can remain in engagement with the external handling device, ready to be used again in a new working cycle.

Removal of the rest surfaces 22a makes it possible, after optional transfer of the building drum 10 to another work unit, to fold down the end flaps 3a of the carcass ply/plies 3 applied around the building drum 10, towards the geometric axis X-X of the building drum 10 itself, for example with the aid of rollers or other devices not shown, that can be made in any convenient manner.

Figure 2:
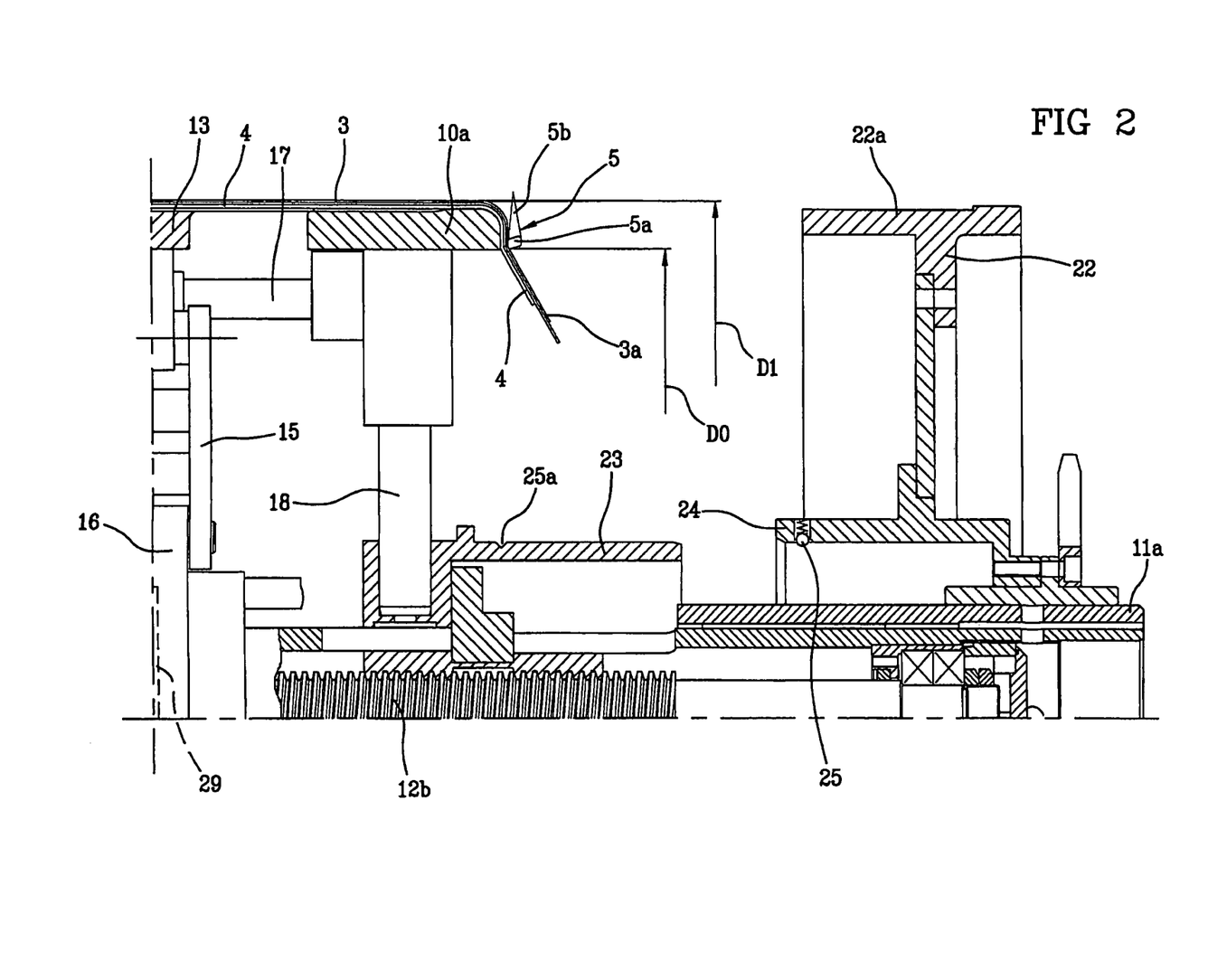
FIG. 2 shows, to an enlarged scale relative to FIG. 1, a step in which annular anchoring structures are coaxially fitted on the respective end flaps of the carcass ply/plies.
Figure 3:
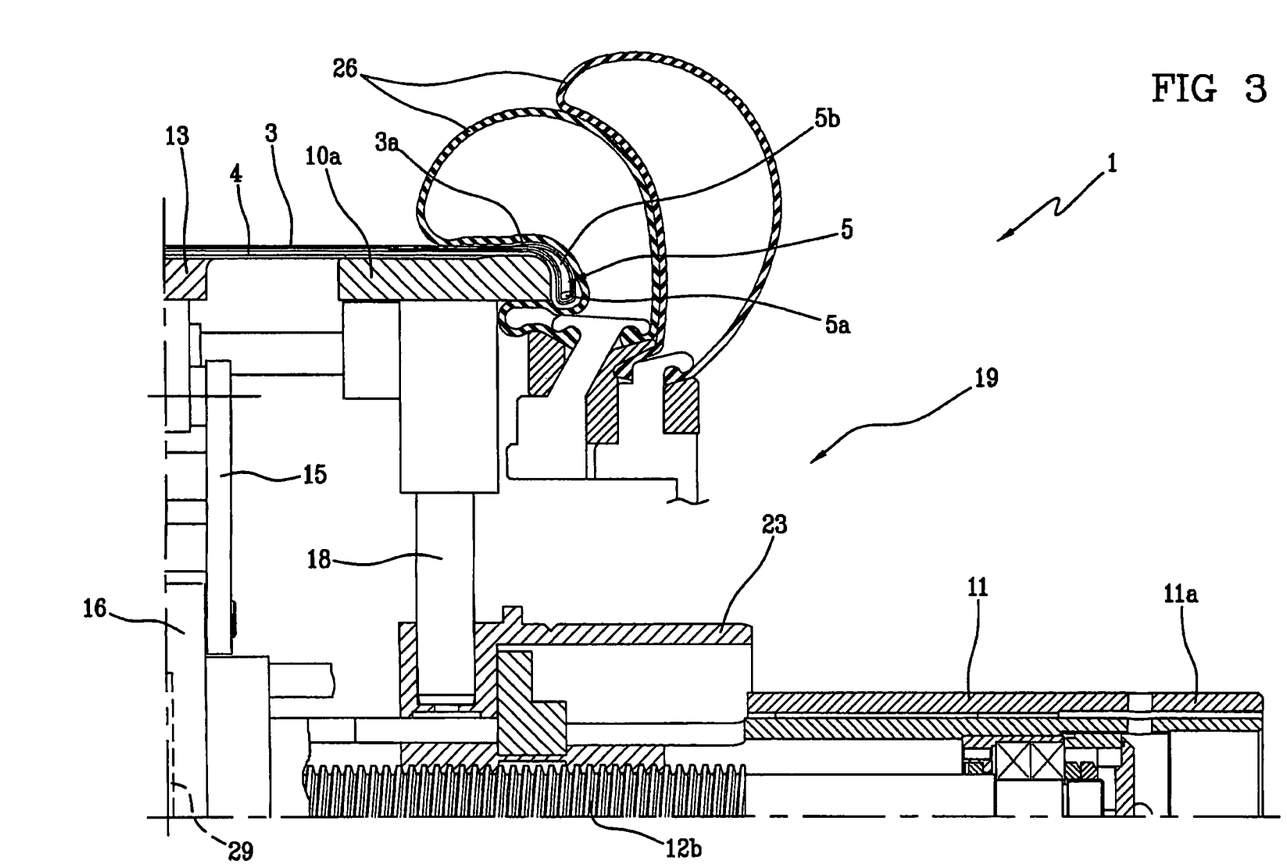
FIG. 3 shows, to an enlarged scale relative to FIG. 1, a step of turning up the end flaps of the carcass ply/plies around the respective annular anchoring structures.

Location members not shown as they can be made in known manner, carry out fitting of each of the annular anchoring structures 5 coaxially around one of the end flaps 3a of the carcass ply/plies 3 folded down towards the geometric axis X-X, so as to position it in axial abutment relationship with the corresponding half of the building drum 10.

When location is over, inflatable bags 23 or other turning-up members (FIG. 3) carry out turning up of each of the end flaps 3a around the respective annular anchoring structure 5, so as to stabilise engagement of the latter with the carcass ply/plies 3, causing formation of said carcass sleeve 21.

When engagement of the annular anchoring structures 5 has been completed, or concurrently with this operating step, application of the sidewalls 9 can take place.

Figure 4:
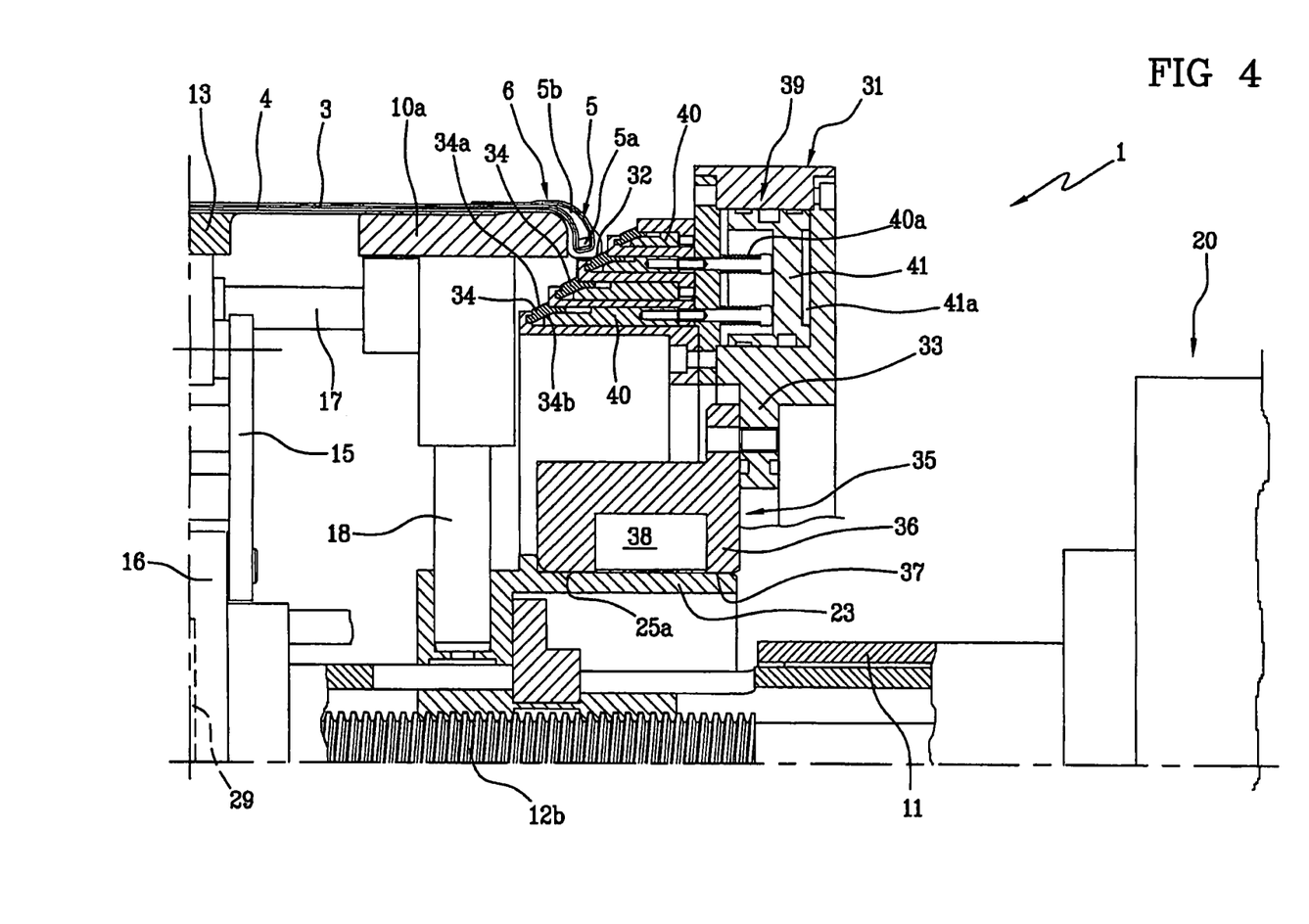
FIG. 4 diagrammatically shows a carcass sleeve in diametrical section during a step of engagement of the beads by auxiliary shaping members.

The building drum 10 carrying the carcass sleeve 21 is then preferably transferred to a position 20 (FIGS. 4 and 5) outside the building station 19, for receiving in engagement an outer sleeve 27 integrating the belt structure 7 preferably already coupled to the tread band 8.

The outer sleeve 27, having an inner diameter D2 greater than the winding diameter D1, can be previously prepared by formation or winding of one or more belt layers adapted to form the belt structure 7, on an auxiliary drum (not shown), and subsequent winding of the tread band 8 on the belt structure 7 carried by the auxiliary drum. More specifically, building of the tread band 8 can be carried out by means of dispensing members delivering an elastomeric continuous elongated element that is applied in the form of coils disposed in side by side relationship and radially superposed on the belt structure 7 carried by the auxiliary drum, while the latter is being driven in rotation. According to an alternative embodiment, at least one portion of the sidewalls 9 can be built on the outer sleeve 27.

The outer sleeve 27 thus formed is adapted to be removed from the auxiliary drum, by a transfer ring 28 for example or other suitable devices that will then dispose it in a coaxially centred position around the carcass sleeve 21 carried by the building drum 10.

Shaping devices then act on the building drum 10 to shape the carcass sleeve 21 into a toroidal configuration (FIG. 5), so as to cause application of same against a radially internal surface of the outer sleeve 27.

The shaping devices can for example comprise the above mentioned actuator (not shown) designed to drive the screw threaded bar 12 in rotation to cause mutual axial approaching of halves 10a of the drum and, as a result, of the annular anchoring structures 5 of the carcass sleeve 21. Preferably, the shaping devices further comprise inflating members having a pneumatic circuit connected with at least one feeding duct 29 formed along the central shaft 11 for example, to feed the carcass sleeve 21 with a working fluid and cause radial expansion of same through inflation, during mutual approaching of the annular anchoring structures 5.

In one embodiment, at least one one-way valve 30 is associated with the feeding duct 29 to prevent the fluid from flowing back from the carcass sleeve 21 to the feeding duct 26, so as to keep the carcass sleeve 21 in an inflated condition even when the feeding duct 29 is disconnected from the pneumatic circuit.

At least one auxiliary shaping member 31 is then operatively engaged with the building drum 10, said member being suitable for integration with the shaping devices to enable execution of the step of shaping the carcass sleeve 21. In more detail, in a preferred embodiment, at least one pair of auxiliary shaping members 31 is operatively engaged with the building drum 10, each of them being in axially approached relationship with one of said halves 10a. The auxiliary shaping members 31, that are components of apparatus 1 distinct from the building drum 10, are each adapted to act against a circumferential abutment edge 32 carried by the building drum 10 itself to enable the carcass ply/plies 3 to be shaped into a toroidal configuration concurrently with mutual approaching of halves 10a.

In more detail, each auxiliary shaping member 31 is adapted to act in thrust relationship against one of the annular anchoring structures 5, each defining one of said circumferential abutment edges 32, to keep beads 6 against the building drum 10 and/or lock the carcass ply/plies 3 relative to the annular anchoring structures 5 during the shaping step, so as to avoid undesirable creeps of the carcass ply/plies or any other undesirable deformation in the regions of beads 6 during radial expansion of the carcass sleeve 21.

Each auxiliary shaping member 31 preferably comprises at least one flanged element 33 that can be removably fastened in axially approached relationship to the respective half 10a of the building drum 10 and carries at least one sealing ring 34 designed to act against the respective annular anchoring structure 5 carried by the building drum 10.

In more detail, advantageously associated with each auxiliary shaping member 31 can be a plurality of sealing rings 34 which are respectively concentric and have different respective diameters. Use of the same auxiliary shaping members 31 for working a wide range of tyres having different fitting diameters is thus advantageously possible.

The auxiliary shaping members 31 can be removably coupled to the respective connecting members 23 of the building drum 10, each of them in place of the respective auxiliary support member 22, by means of a fastening device 35 operatively carried by the flanged element 33. This fastening device 35 preferably comprises a guide sleeve 36 internally defining a second engagement seat 37 to be slidably engaged on the respective connecting member 23. Operatively mounted at the engagement seat 37 is a brake 38, preferably of the hydraulic or pneumatic type, not described in detail as it can be made in any convenient manner. After each of the auxiliary shaping members 31 has been fitted on the respective connecting member 23 and they have been axially translated until one of the respective sealing rings 34 has been brought against the annular anchoring structure 5 of the carcass sleeve, brakes 38 are driven to cause a steady axial anchoring of the auxiliary shaping members relative to the building drum 10.

Preferably, each sealing ring 34 acts against the respective annular anchoring structure 5 by a radially external frusto-conical surface 34a of the sealing ring 34 itself. The sealing ring 34 thus can exert a thrust action against the carcass ply/plies 3 turned up around the annular anchoring structure 5, which thrust action is concentrated on a radially internal circumferential edge of the annular anchoring structure 5 (coincident with said abutment edge 32). Therefore, this thrust action appears to be particularly suitable for avoiding undesirable creeps of the cords forming the carcass ply/plies 3 by effect of stresses transmitted during the shaping step.

At the same time, the sealing rings 34 preferably having a continuous circumferential extension perform the function of sealingly closing the carcass sleeve 21 at the annular anchoring structures 5, thereby facilitating radial expansion of the sleeve and maintenance of the inflated condition following the shaping step.

The Applicant has further noticed that the thrust action exerted by the sealing rings 34 could however decrease during the shaping step, due to yielding which is typical of the raw elastomer material.

It is therefore preferably provided for each auxiliary shaping member 31 to further comprise thrust devices 39 operating between the respective flanged element 33 and the sealing rings 34, so that the sealing ring 34 that is acting against the respective annular anchoring structure 5 is maintained in thrust relationship against the latter during the whole shaping step of the carcass sleeve 21. In this manner, arising of creep phenomena of the cords of the carcass ply/plies 3 turned up around the annular anchoring structures 5 are avoided even in the presence of plastic yielding of the elastomeric material disposed close to beads 6.

According to a preferred embodiment, the thrust devices 39 comprise at least one thrust ring 40 slidably in engagement with the flanged element 33 and axially movable towards the sealing ring 34 upon the action of a fluid-operated actuator 41.

More particularly, a plurality of thrust rings 40 is preferably provided, each of them being associated with one of the sealing rings 34. Each sealing ring 34 is radially expandable by effect of axial movement of the respective thrust ring 40. In order to facilitate this expansion, each sealing ring 34 can have a radially internal frustoconical surface 34b facing a circumferential edge of the thrust ring 40, so as to facilitate radial expansion.

Advantageously, a single fluid-operated actuator 41, comprising an annular piston for example that is pushed by air or other fluid under pressure admitted to a cavity 41a formed in the flanged element 33, can simultaneously operate on all thrust rings 40 associated with the respective auxiliary shaping member 31, overcoming the action of respective return springs 40a. The thrust action however will act only on the sealing ring 34 operating in abutment against the annular anchoring structure 5.

In conclusion, during the whole shaping step, the action of brakes 38 on the respective connecting members 23 ensures steady positioning of the auxiliary shaping members 31, efficiently counteracting the important stresses tending to axially move them away from the building drum 10, by effect of the inflating pressure created within the carcass sleeve 21. At the same time, the thrust devices 39 make sure of the fact that, notwithstanding the axial locking carried out by brakes 38, the sealing rings 34 are constantly maintained in thrust relationship against the annular anchoring structures 5, even in the presence of plastic yielding of the elastomeric material.

When the shaping step has been completed, brakes 38 can be deactivated to enable axial removal of the auxiliary shaping members 31 from the building drum 10. The building drum 10 can then be optionally transferred to at least one additional work station (not shown).

Advantageously, due to the presence of the one-way valve 30 and of flanges 29 with the sealing rings 34 in a thrust condition against the annular anchoring structures 55, the inflated condition of the carcass sleeve 21 is maintained, so as to facilitate other possible working operations to be carried out in additional work stations.

When building is over, tyre 2 can be removed from the building drum 10 after release of the auxiliary shaping members 31 and radial contraction of the drum itself, so that it can be submitted to a vulcanisation step to be carried out in any convenient manner.

The invention claimed is:

1. A process for building tyres, comprising:
providing, at at least one building station, a building drum comprising two halves capable of being axially moved close to each other;
engaging auxiliary support members with the building drum, each of said auxiliary support members having at least one circumferential rest surface extending in a continuation of the outer circumferential surface of the building drum, each of said auxiliary support members being in axially approached relationship with one of said halves, wherein each auxiliary support member is engaged with the building drum at at least one connecting member carried by the building drum;
applying at least one carcass ply around an outer circumferential surface of the building drum;
releasing said auxiliary support members from the building drum;
after releasing said auxiliary support members from the building drum, engaging at least one annular anchoring structure with at least one end flap of said at least one carcass ply so as to form a carcass sleeve;
after engaging said at least one annular anchoring structure, transferring the building drum to a work station outside of the at least one building station;
after transferring the building drum to the work station, removably fastening, in axially approached relationship, at least one auxiliary shaping member distinct from the building drum, to a respective half of the building drum transferred to the work station, wherein each auxiliary shaping member is engaged on said at least one connecting member, in place of each auxiliary support member, and wherein a radially external surface of a sealing ring of said at least one auxiliary shaping member acts against a circumferential abutment edge carried by the building drum; and
shaping said at least one carcass ply into a toroidal configuration concurrently with mutual approaching of the halves of the building drum carrying said auxiliary shaping members.

2. The process as claimed in claim 1, wherein said at least one carcass ply applied around the outer circumferential surface of the building drum has axially opposite end flaps each laying on the circumferential rest surface of a respective auxiliary support member.

3. The process as claimed in claim 1, wherein a pair of auxiliary shaping members is removably fastened the building drum, each auxiliary shaping member being in axially approached relationship with one of said halves.

4. The process as claimed in claim 1, comprising, after said shaping step, the steps of radially contracting the building drum and of releasing a tyre being processed from the building drum.

5. The process as claimed in claim 1, wherein before engagement of said annular anchoring structures, axially opposite end flaps of said at least one carcass ply are turned down toward a geometric axis of the building drum.

6. The process as claimed in claim 1, wherein the step of engaging each annular anchoring structure comprises:
coaxially fitting the annular anchoring structure around a respective end flap of said at least one carcass ply; and
turning up the end flap of said at least one carcass ply around a respective annular anchoring structure.

7. The process as claimed in claim 1, wherein said at least one auxiliary shaping member is brought into thrust relationship against said at least one annular anchoring structure.

8. The process as claimed in claim 1, comprising, concurrently with engagement of said at least one auxiliary shaping member with the building drum, a step of locking said at least one carcass ply relative to said at least one annular anchoring structure.

9. The process as claimed in claim 1, wherein removably fastening of said at least one auxiliary shaping member with the building drum comprises the steps of fastening a flanged element of the auxiliary shaping member relative to the building drum, and pushing said sealing ring of the auxiliary shaping member against said circumferential abutment edge.

10. The process as claimed in claim 1, comprising, before shaping of the carcass ply, a step of positioning an outer sleeve comprising at least one belt structure in a coaxially centred position around said at least one carcass ply, in order to apply said at least one carcass ply against a radially internal surface of the outer sleeve following the shaping step.

11. The process as claimed in claim 1, wherein at least said carcass ply is obtained through laying of elementary components onto the building drum.

12. The process as claimed in claim 1, wherein application of said at least one carcass ply comprises a step of applying a plurality of strip-like elements disposed in succession along the circumferential extension of the outer circumferential surface of the building drum.

13. The process as claimed in claim 1, wherein the at least one auxiliary shaping member acts against the building drum concurrently with the mutual approaching of said halves, to enable said at least one carcass ply to be shaped into a toroidal configuration.

14. A process for building tyres, comprising:
providing, at at least one building station, a building drum comprising two halves capable of being axially moved close to each other;
engaging auxiliary support members with the building drum, each of said auxiliary support members having at least one circumferential rest surface extending in a continuation of the outer circumferential surface of the building drum, each of said auxiliary support members being in axially approached relationship with one of said halves;
applying at least one carcass ply around an outer circumferential surface of the building drum;
releasing said auxiliary support members from the building drum;
after releasing said auxiliary support members from the building drum, transferring the building drum to a work station outside of the at least one building station;
after transferring the building drum to the work station, removably fastening, in axially approached relationship, at least one auxiliary shaping member distinct from the building drum, to a respective half of the building drum transferred to the work station; and
shaping said at least one carcass ply into a toroidal configuration concurrently with mutual approaching of the halves of the building drum;
wherein removably fastening of said at least one auxiliary shaping member with the building drum comprises the step of steadily fastening a flanged element of the auxiliary shaping member to a respective connecting member carried by a respective half of the building drum, and
wherein shaping of said at least one carcass ply comprises the step of maintaining a radially expandable sealing ring of the auxiliary shaping member against a circumferential abutment edge carried by the building drum by thrust devices acting between the flanged element and the sealing ring to radially expand said sealing ring.

15. The process as claimed in claim 14, wherein said at least one carcass ply applied around the outer circumferential surface of the building drum has axially opposite end flaps each laying on the circumferential rest surface of a respective auxiliary support member.

16. The process as claimed in claim 14, wherein a pair of auxiliary shaping members is removably fastened the building drum, each auxiliary shaping member being in axially approached relationship with one of said halves.

17. The process as claimed in claim 14, comprising, after said shaping step, the steps of radially contracting the building drum and of releasing a tyre being processed from the building drum.

18. The process as claimed in claim 14, comprising, after the step of releasing the auxiliary support members and before the step of removably fastening said at least one auxiliary shaping member, the step of engaging at least one annular anchoring structure with at least one end flap of said at least one carcass ply so as to form a carcass sleeve.

19. The process as claimed in claim 18, wherein before engagement of said annular anchoring structures, axially opposite end flaps of said at least one carcass ply are turned down toward a geometric axis of the building drum.

20. The process as claimed in claim 18, wherein the step of engaging each annular anchoring structure comprises:
coaxially fitting the annular anchoring structure around a respective end flap of said at least one carcass ply; and
turning up the end flap of said at least one carcass ply around a respective annular anchoring structure.

21. The process as claimed in claim 18, wherein said at least one auxiliary shaping member is brought into thrust relationship against said at least one annular anchoring structure.

22. The process as claimed in claim 18, comprising, concurrently with engagement of said at least one auxiliary shaping member with the building drum, a step of locking said at least one carcass ply relative to said at least one annular anchoring structure.

23. The process as claimed in claim 14, comprising, before shaping of the carcass ply, a step of positioning an outer sleeve comprising at least one belt structure in a coaxially centred position around said at least one carcass ply, in order to apply said at least one carcass ply against a radially internal surface of the outer sleeve following the shaping step.

24. The process as claimed in claim 14, wherein at least said carcass ply is obtained through laying of elementary components onto the building drum.

25. The process as claimed in claim 14, wherein application of said at least one carcass ply comprises a step of applying a plurality of strip-like elements disposed in succession along the circumferential extension of the outer circumferential surface of the building drum.

26. The process as claimed in claim 14, wherein the at least one auxiliary shaping member acts against the building drum concurrently with the mutual approaching of said halves, to enable said at least one carcass ply to be shaped into a toroidal configuration.

* * * * *